July 12, 1932.  M. D. CHESNUT  1,866,620
SPRAYER
Filed Feb. 28, 1930
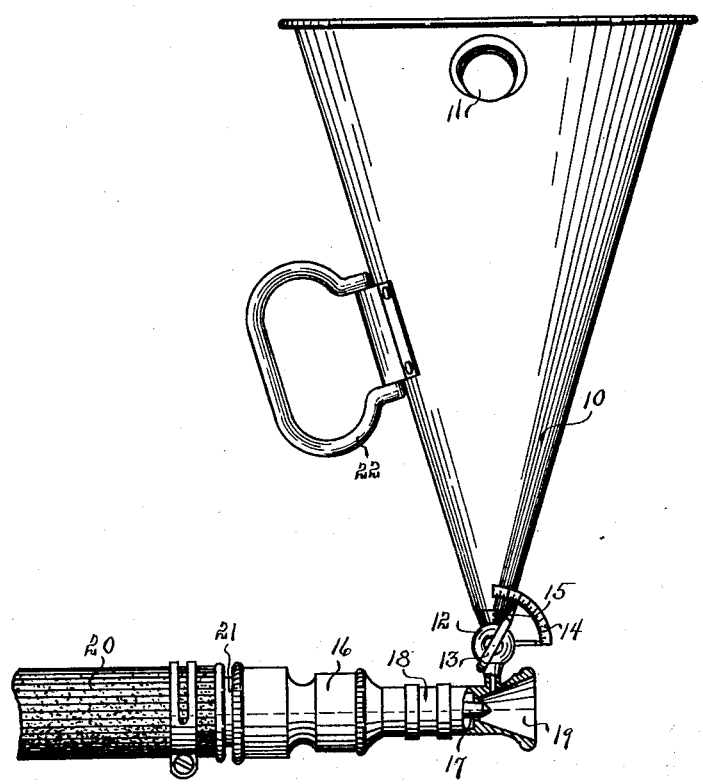
Inventor
Mollie D. Chesnut
By M. Talbert Dick
Attorney Patented July 12, 1932

1,866,620

UNITED STATES PATENT OFFICE

MOLLIE D. CHESNUT, OF DES MOINES, IOWA

SPRAYER

Application filed February 28, 1930. Serial No. 432,236.

The principal object of this invention is to provide an efficient and successful sprayer for killing slugs, spiders, aphis, caterpillars, tree ants and the like that infest shrubbery, roses, trees and similar plant life.

A further object of my invention is to provide a sprayer for the killing of insects that is free from being fouled or clogged up by the insecticide being used.

A still further object of this invention is to provide a sprayer that will mechanically mix and spray free oils and water, thereby eliminating the unnecessary cost and time of converting such oils first into water soluble liquids.

A still further object of this invention is to provide a spraying device that may be quickly and easily secured for operation to an ordinary garden hose, thereby providing a continuous spray and eliminating the need of hand or motor driven equipment.

A still further object of my invention is to provide a liquid insecticide sprayer used in combination with a garden hose or air compression liquid tank that may be easily and accurately adjusted relative to the amount of insecticide used in proportion to the water sprayed.

A still further object of this invention is to provide a liquid insecticide sprayer to be used in combination with water under pressure that is capable of using oil of tar and other resinous liquids for the insecticide and which cannot be emulsified.

A still further object of my invention is to provide a sprayer for spraying liquid insecticides with water under pressure that may be successfully used even when the nozzle is pointing upwardly in a near vertical position and only a very small amount of insecticide is inside the insecticide reservoir.

A still further object of this invention is to provide a sprayer for killing insects that infest plant life that is economical in manufacture and durable in use.

These and other objects will be apparent to those skilled in the art.

My invention consists in the construction, arrangement and combination of the various parts of the device, whereby the objects contemplated are attained as hereinafter more fully set forth, pointed out in my claims and illustrated in the accompanying drawing, in which:

The figure is a side view of my invention attached to a garden hose with a portion of the nozzle cut away to more fully illustrate its construction.

I have used the numeral 10 to designate the reservoir for holding the liquid insecticide. This reservoir is of inverted cone construction and has the filling cap 11 near its top as shown in the figure. Secured on the lower end of the inverted cone shaped reservoir and communicating with the same is an ordinary valve 12 having the manually operated handle 13 for opening, closing or restricting its opening. In order to accurately regulate this manually operated valve and to visibly ascertain at a glance its condition I have provided a scale 14 and a pointer 15 on the handle 13 which moves adjacent to the scale and registers thereon when the manually operated valve is actuated. By this arrangement the manually operated valve may be easily and quickly adjusted to permit the desired amount of liquid insecticide to pass out of the reservoir 10 and through the manually operated valve.

In the figure, I show my invention having an ordinary adjustable spray nozzle similar to spray nozzles used on garden hose, the construction of which is known by all familiar with spray nozzles. In this view I have designated the base portion of the spray nozzle by the numeral 16 having the needle valve portion 17. Threaded into the base portion is the end portion 18 having its opening embracing the tapered needle 17 and its flared end 19 tapering forwardly and outwardly in the common and well known manner. Secured by suitable means to the member 18 and communicating with the inside of the flared end 19 and forward of the opening through which the needle 17 passes is the lower end of the manually operated valve 12 as shown in the figure. The numeral 20 designates a flexible hose having one end designed to be in communication with a supply of water under pressure and its other end secured to the usual threaded connection 21 designed to be threaded into the rear end of the base or barrel member 16.

By this arrangement when the reservoir 10 is filled with liquid insecticide the manually operated valve 12 may be opened as desired by the handle 13 and the insecticide will run from the reservoir 10, through the manually operated valve 12 and into the flared end 19 of the nozzle or spray portion of the invention. As water is passing through and being sprayed by the spray nozzle it will pick up all of the insecticide and act as a vehicle to carry the insecticide to the plant or tree to be treated. As is well known if the member 18 is rotated in either direction the needle 17 will either restrict or increase the opening in the member 18 through which it extends thereby producing a heavy or light spray. The amount of insecticide being used relative to the amount of water used will depend upon the adjusting of the manually operated valve 12 as we have seen. I have also found that by loosening the filling cap 11 to permit air to enter the reservoir above the insecticide therein, the same will pass through the manually operated valve 12 at about twice the amount in a given length of time than it would otherwise do. By the manually operated valve 12 communicating with the inside of the flared end 19 forward of the opening through which the needle 17 extends the spray liquid from the reservoir 10 is introduced into the apex of the spray cone formed by water emerging in a whirling motion; it being well known that water rushing into or out of a cone portion assumes a whirling motion. Liquids thus introduced from reservoir 10 are picked up and thoroughly mixed with the water under pressure emerging from the spray nozzle, before passing beyond the flared end 19. By this means free oils are applied in a film over insects and surfaces to be treated in any desired proportions of oil to the water, as accurately as though previously emulsified, and more efficiently from the standpoint of contact sprays for the reason that no deterrent chemical is required in this mechanical process.

To facilitate the manual operation of the invention I have provided a handle member 22 secured to the reservoir 10. The type of handle shown in the figure is of the hinge type thereby permitting the spray nozzle which is held in the other hand to be easily turned in any direction.

By this reservoir 10 being of inverted cone construction the remaining liquid in the reservoir will always be at the manually operated valve end of the same even when the spraying device is pointing almost in an upward vertical position. The operator is thereby always assured when spraying trees and the like that the insecticide is being sprayed with the water.

Although I have described my invention to be used for the spraying of plant life it may be used to equal advantage in many other and varied usage such as the spraying and killing of mites, vermin and the like that attack poultry and animals.

Some changes may be made in the construction and arrangement of my improved sprayer without departing from the real spirit and purpose of my invention, and it is my intention to cover by my claims any modified forms of structure or use of mechanical equivalents which may be reasonably included within their scope.

I claim:

1. In a device of the class described, a hollow member having one of its ends opened and flared and its other end designed to be in communication with a source of water under pressure, a manually adjustable spraying mechanism inside said hollow member and some distance from the marginal edge of said flared end designed to be supplied with the said source of water under pressure, and a reservoir communicating with the inside of said flared end at a point forward of said spraying mechanism.

2. In a device of the class described, a reservoir of inverted cone shaped construction, a filling cap near the top of said reservoir, a handle member secured to said reservoir, a hollow member having one of its ends opened and flared forwardly and outwardly and its other end designed to be in communication with a source of water under pressure, a manually adjustable spraying mechanism inside said hollow member and some distance from the marginal edge of said flared end designed to be supplied with the said source of water under pressure, and a second hollow member having one of its ends communicating with the inside bottom of said reservoir and its other end communicating with the inside of said flared end portion of said first mentioned hollow member at a point between the marginal edge of said flared portion and said adjustable spraying mechanism.

MOLLIE D. CHESNUT.